May 13, 1930.  H. W. BELL  1,758,554
FLEXIBLE CONNECTION
Filed Aug. 24, 1926
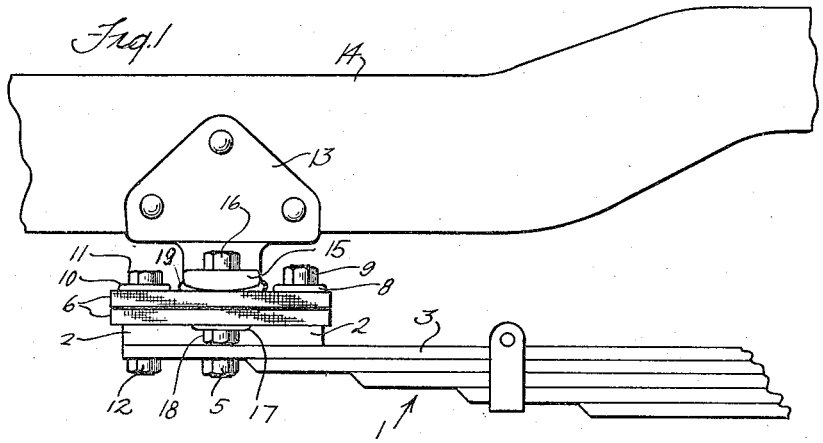
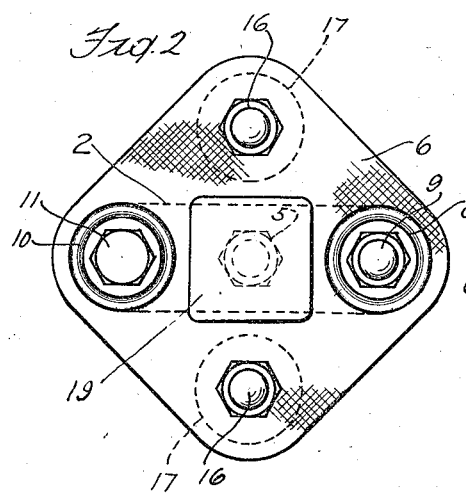
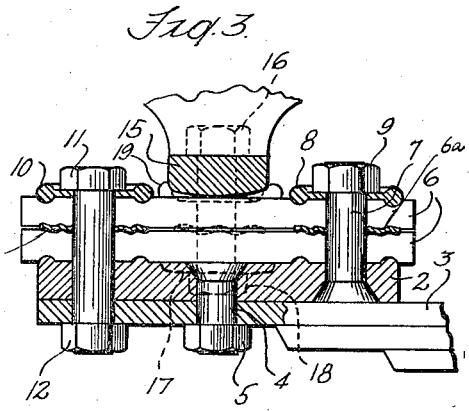
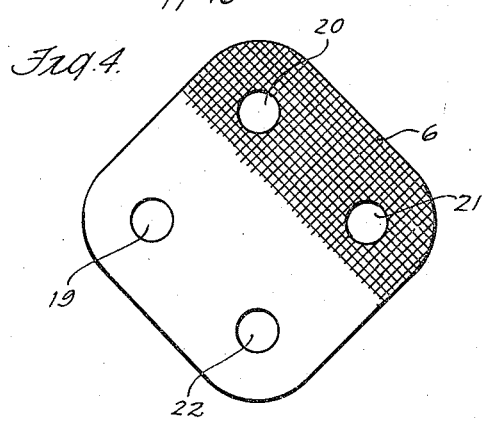
INVENTOR.
HARVEY W. BELL
BY Moses & Nolte
ATTORNEYS.

Patented May 13, 1930

1,758,554

UNITED STATES PATENT OFFICE

HARVEY W. BELL, OF ARDSLEY ON HUDSON, NEW YORK, ASSIGNOR TO THE BELOYT CORPORATION OF NEW YORK, N. Y., A CORPORATION OF DELAWARE

FLEXIBLE CONNECTION

Application filed August 24, 1926. Serial No. 131,142.

This invention relates to flexible connections. For purposes of illustration it will be described herein with particular reference to flexible connections between the frame or body of a motor vehicle and other parts thereof such as the springs, it being definitely understood however that the invention is not limited to such use, but capable of many other applications in the automotive and other arts, as a flexible connection, or supporting means.

The utilization of flexible plates or links, of fabric or other suitable non-metallic materials, as a means of flexibly connecting relatively movable members such as the parts of a motor vehicle, is disclosed and broadly claimed in my pending application Serial No. 363,189 for spring suspensions, filed March 4, 1920, now Patent No. 1,660,029.

The present invention in one respect is in the nature of an improvement upon the invention disclosed in my pending application Serial No. 532,744 for flexible connections, filed January 20, 1922, now Patent No. 1,660,031, dated February 21, 1928.

In one embodiment of said pending application the connection between the spring and body is effected through flexible, inelastic, non-metallic plates or discs and through crossed bearing members connected to the frame and spring respectively, and connected at their opposite ends to the discs, the arrangement being such that the spring and body can rock transversely and longitudinally, due to the flexibility of the discs.

This construction has the advantages, among others, that it is durable, is absolutely silent in operation, and requires no lubrication.

The present invention has for its principal object to provide a connection of this same general type which is stronger and more resistant to permanent distortion than the prior construction and which can be constructed more cheaply than the connection of said prior application.

Other objects and advantages will hereinafter appear.

In the drawings forming a part of this specification:

Figure 1 is a fragmentary, side elevation of a motor vehicle showing a leaf spring connected to the vehicle frame by a shackle of the type referred to;

Figure 2 is a plan view of a flexible shackle embodying features of the present invention;

Figure 3 is a vertical sectional view of the shackle of Figure 2 showing how it is connected to the vehicle and to the spring; and Figure 4 is a detail, plan view showing one of the fabric plates employed in the shackle.

A laminated spring 1 has a rigid base plate 2 secured upon an end of the master leaf 3. Such securement is effected in part by a short bolt 4 and nut 5. Substantially square, non-metallic, flexible plates 6 of fabric, preferably rubberized fabric, are mounted upon the base plate 2, being secured to one end of the base plate by a bolt 7, washer 8 and nut 9, and to the other end of the base plate by washer 10, bolt 11 and nut 12, the latter bolt passing through the end of the master leaf as well as through the other elements referred to. The base plate 2 extends diagonally of the square flexible plates 6 and is secured to them adjacent opposite corners thereof. A bracket 13 projects downward from a side frame member 14 of the vehicle frame and terminates in a clamping member 15 having a rounded lower face bearing on the upper side of the flexible plates 6. This bearing member 15 extends diagonally across the flexible plates substantially at right angles to the base plate 2 and is secured at its ends to opposite corners of the flexible plates by means of bolts 16, washers 17 and nuts 18.

A soft rubber cushion block 19 preferably integral with the upper fabric plate 6 may be provided to protect the flexible plate against wear.

The principal advantages of the present invention are: (1) economy of manufacture due to the use of square fabric links, and (2) high resistance to tensile and torsional strains due to the disposition of the warp and woof threads of the fabric with relation to the directions of the forces acting on the links.

As heretofore constructed, the flexible fabric plates have been made circular in form. This involved the waste of considerable material in blanking the discs from continuous stock. Furthermore, the segments of the circular plates lying outside the clamped or connected area had little, if any, utility in resisting strain so that the material forming these segments was little utilized. In accordance with one phase of the present invention, the fabric is woven in a straight strip preferably of just the proper width for use in the shackle described, and this fabric is cut into plates of the appropriate size with substantially no waste of material. This method of manufacturing the plates provides two selvage edges which do not fray or wear readily. The two cut edges also are quite durable since the cuts extend parallel to the woof threads.

For the purpose of making the flexible plates more resistant to the strains to which they are subjected, and to oppose permanent distortion or stretching, it is a point that the warp and woof threads extend squarely between the openings 19 and 20, 20 and 21, 21 and 22, and 22 and 19 of the fabric plates. In other words part of the threads, say the warp threads, extend parallel to lines connecting the openings 19 and 20 and the openings 21 and 22, while the other threads, the woof, extend parallel to lines connecting the openings 19 and 22, and 20 and 21. Preferably the warp and woof threads of the fabric are equal in number and strength, so that the fabric is as strong in one direction as in the other. Any tendency of the vehicle body to move bodily with relation to the spring must be resisted by direct pulls in directions parallel to the edges of the plates. Hence, the arrangement of the threads to extend parallel to the edges of the plates disposes them to withstand these forces most effectively, and to render the plates highly resistant to permanent distortion.

In order to utilize the strength of the threads to the best advantage and to distribute the pull, clamping washers 8, 10 and 17 are provided with ribs or flanges for indenting and gripping the fabric, and the base plate 2 and bearing member 15 are provided with cooperating circular flanges. Corrugated clamping washers 6ª may also be interposed between the plates at each point of clamping. As a result of this construction, the pull between each adjacent pair of connections to the flexible fabric plate is distributed over a band of substantial width so that the strain is exerted by direct pull upon a multiplicity of the fibres.

The disposition of the threads to extend from bolt hole to bolt hole is, of course, useful independently of the shape in which the plates are cut, and of the use to which the plates are put.

Variations may be resorted to within the scope of the invention and parts of the improvements may be used without others.

What I claim is:

1. In combination, a supporting member, a supported member, a substantially square, flexible fabric plate having its warp and woof threads extending substantially parallel to edges of the plate, crossed rigid members connected respectively to the supported and supporting members and extending along the diagonals of the plate at opposite sides thereof and bearing against one another through the plate in the crossing area to sustain the weight of the supported body in compression, each of said rigid members being clamped to the plate at diagonally opposite points, so that the points of connection of the plate to the respective rigid members alternate, the arrangement being such that adjacent connection points are joined in each instance by threads of fabric aligned with such points so that relative movement between the rigid members is invariably resisted by direct tensioning of some of the threads and diagonal tensioning of the plate is limited.

2. A structure as set forth in claim 1, wherein each clamping connection of a rigid member to the flexible plate is effected over a sufficient area to distribute the pull between a multiplicity of threads.

3. In a connection of the kind described, in combination, a flexible fabric plate, crossed rigid members extending at opposite sides of the plate and bearing one upon the other through the plate at the crossing area, said rigid members having their ends clamped to the plate so that the four points of clamping connection form the vertices of a rectangle, the warp threads of said plate extending parallel to two of the sides of such rectangle, and the woof threads extending parallel to the other sides of such rectangle so that the pull exerted upon the plate by relative movement of the rigid members is resisted in every instance by direct tensioning of some of the threads and diagonal tensioning of the plate is limited.

In testimony whereof I have affixed my signature to this specification.

HARVEY W. BELL.